`United States Patent Office`

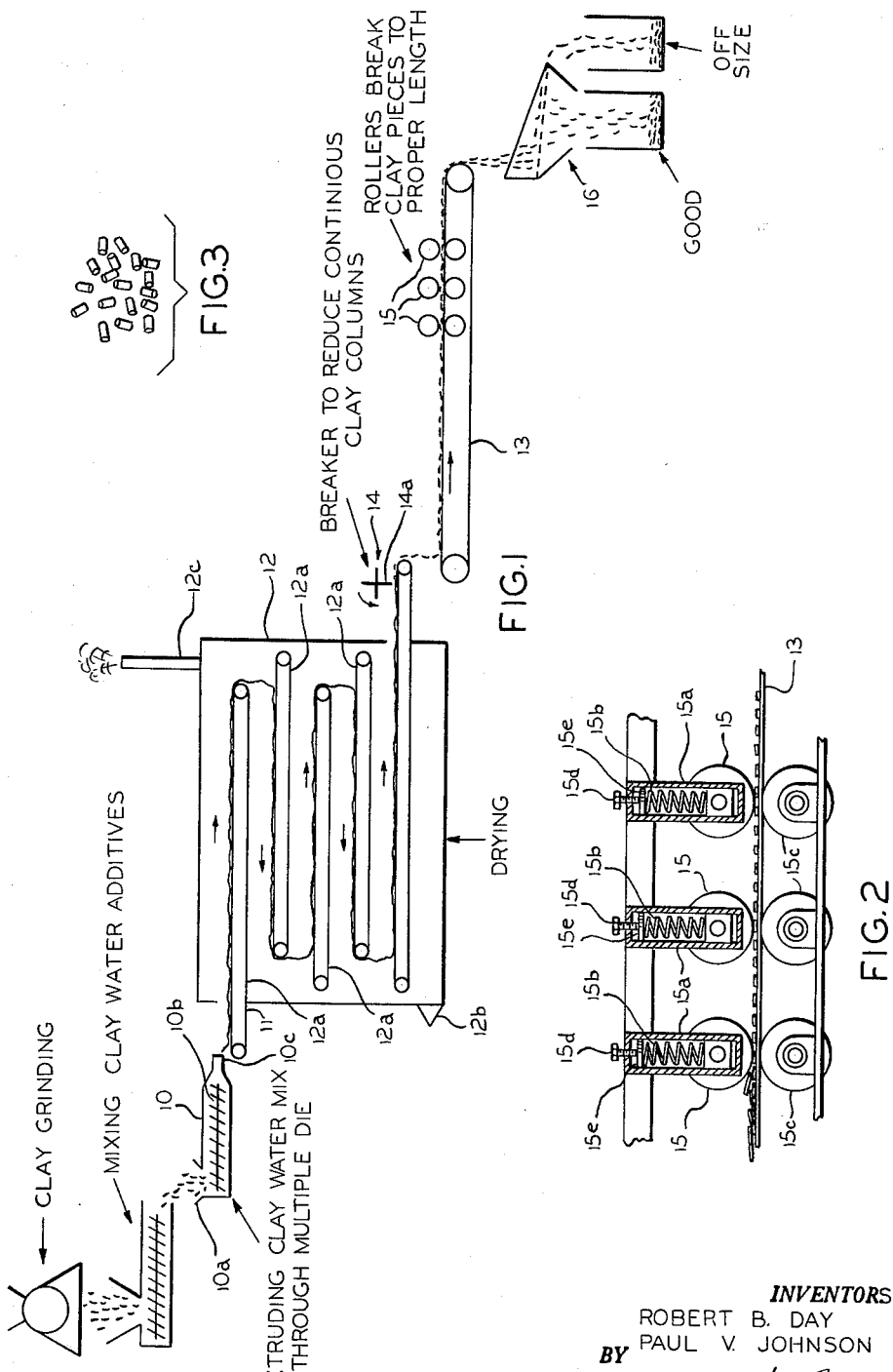

3,202,746
Patented Aug. 24, 1965

3,202,746
METHOD AND APPARATUS FOR MANUFACTURING SMALL CLAY CYLINDERS
Robert B. Day and Paul V. Johnson, Geneva, Ill., assignors, by mesne assignments, to Structural Clay Products Institute, Geneva, Ill., a corporation of Delaware
Filed Dec. 8, 1961, Ser. No. 157,930
8 Claims. (Cl. 264—141)

The present invention is directed to a new and improved method and apparatus for manufacturing small clay cylinders. These cylinders may have a width or diameter of approximately .015 to .050 inch and a length two or three times their diameters. Clay cylinders of this type may be used for the purpose of making bloated clay particles through a heating process.

The major purposes of the present invention are to create an improved method and apparatus for converting moist dough-like clay into small cylinders as heretofore described, to so arrange a system as to enable the use of a continuous conveyor or production line technique for the manufacture of such particles, these and other purposes of the invention being more apparent when viewed in the light of the following specification when taken with the accompanying drawings, in which:

FIGURE 1 is a diagrammatic flow sheet of the method of the present invention;

FIGURE 2 is an enlarged detailed view of certain roller elements illustrated in FIGURE 1;

FIGURE 3 is a view of small clay particles formed in accordance with the principles of the present invention.

Similar elements are designated by similar reference characters throughout the specification and drawings.

With particular reference now to the drawings, and in the first instance to FIGURE 1, the numeral 10 generally designates an extrusion press. This extrusion press 10 is adapted to receive moist, dough-like clay through an inlet 10a. The dry clay may be ground to a powder sized to minus 50 mesh and then mixed with water. This clay mass contains approximately 16 to 20 percent water by weight and is somewhat softer than a normal stiff mud brick column. The material fed into the extrusion facilities is actually a plastic mixture of clay and water. The extrusion press 10 includes an auger 10b for forcing the dough-like clay through a plurality of small orifices in a plate 10c. As the clay is forced against the plate 10c and passes through the orifices, it is converted into a plurality of elongated and relatively fine streams or threads, the diameter of each thread being governed by the size of the orifices. The size of the orifices is on the order of the size of the streams desired, which may, for example, be on the order of .015 to .050 inch.

These threads or streams issue from the extrusion plate 10c continuously as long as material is supplied to the extruding system through the inlet 10a. The streams which are diagrammatically represented at 10d are received by an outer end 11 of an elongated conveyor belt 12a which transfers the stream to a drying tunnel 12.

The drying tunnel 12 includes a plurality of vertically spaced, endless conveyor belts 12a, with the exit end of one belt being positioned inwardly with respect to the entrance end of the belt next below. Thus, as the fine streams of material pass to the uppermost belt 12a they are conveyed along this belt to the end thereof where they fall off of this belt to the next lower belt. The next lower belt then reverses the direction of travel and carries these streams to the other end of the drying tunnel where it deposits the streams on the next lower belt, and so on, until the streams are deposited by the lowermost conveyor belt of the system onto an external conveyor belt 13.

Any suitable means may be employed for maintaining a circulation of hot air from an inlet 12b, through the drying tunnel and thence to an exhaust 12c. In this connection, the number of belts 12a and the speed of the belts is so arranged within the tunnel that the streams are dried by the time that they exit from the tunnel.

It should be noted that the reverse travel imparted to the clay streams by the conveyor belts 12a causes the streams to be turned over, as they pass from one belt to the other, all of which enhances the drying process.

The dried clay streams pass along the upper surface of the lowermost belt 12a to a breaker 14 which is positioned outside of the tunnel. As illustrated in the drawings, the breaker 14 consists of a plurality of paddles or blades 14a which are rotated by means of an electric motor or other means. The ends of the blades 14a impinge upon the dry clay streams passing along the upper surface of the belt 13 and break the streams into short lengths. The breaker 14 is employed essentially to break up the substantially continuous nature of the streams into shorter lengths. In actual practice the breaker 14 may break up these streams into elongated threads ¼ of an inch in length or more, there being considerable variance in the length of the pieces issuing from the breaking facilities.

The lengths of dry clay then pass through a series of breaking rollers 15 where they are broken up into shorter and more uniform lengths. As is particularly seen in FIGURE 2 these rollers are carried by frame members 15a. Adjustable springs 15b bear against the axles of the rollers to force the rollers downwardly against the upper surface of belt 13. Backing rollers 15c are positioned beneath the belt 13 and vertically opposed to each of the rollers 15. The biasing force exerted by the springs 15b may be adjusted by means of threaded members 15d which carry abutments 15e bearing against the springs 15b so as to vary the compression of the springs. The spring pressure and the rollers are so positioned that in the absence of material passing along the belt, the rollers bear against the surface of the belt and against their vertically aligned back up rollers 15c.

As the thread-like streams, which are of relatively short length, pass through the first roller, the first roller 15 may yield upwardly slightly depending upon the thickness of the mass of dry clay threads passing therebetween. In passing the first roller a number of these threads are broken up into short lengths, apparently due to deflection of them. The roller pressure is insufficient, however, to crush these threads.

It is advantageous to employ a plurality of such rollers spaced along the length of the belt as is illustrated in the drawings. In this regard, the second and third rollers serve to break up threads which are not broken by the first roller. This is especially important, when considered in relation to the fact that the thickness of the thread mass passing to the first roller may vary considerably. In the case of thick masses, the first roller may yield upwardly sufficiently as to cause breaking of only a few of the threads.

In passing the first roller, however, the mass tends to spread itself more uniformly along the width of the belt so that the second roller will break up more of the threads. The same action in breaking the threads is applied both by the second and third rollers. With the spring pressure properly adjusted, small cylinders of proper length will pass between the rollers and the belt without being broken at all.

As the finally broken threads pass the last breaking roller in the series, they pass to screen facilities designated at 16. The screening facilities 16 serve to separate particles which are too long from the usable particles. Those particles which are too long may be recycled through the breaking rollers 15. The usable product has an appearance such as is illustrated in FIGURE 3, the showing in FIGURE 3 being enlarged from the actual product produced.

In operation, the elongated fine streams of the moist, dough-like clay issuing from the extrusion facilities are dried through subjection to the elevated temperatures in the drier. After leaving the drier, the streams are considerably more rigid and may be broken through bending.

The streams then pass to the breaker where the bending action imparted to the streams is sufficient to break the streams into a multiplicity of short lengths, which may, for example, be on the order of ¼ of an inch long. The breaking facilities may take other forms, as, for example, a vertically reciprocating knife which periodically descends against the streams of clay moving along the conveyor belt. The breaker may leave considerable variance in the length of the clay pieces. This may be due to the variation in the thickness in mass of the stream passing the breaker.

These lengths of dried clay pieces then pass to the final sizing stage wherein the several rollers break up the clay into shorter lengths. The rollers break a large portion of the pieces into substantially uniform lengths, which, by way of example, may be on the order of two or three times the diameter of the clay streams.

The yieldable roller pressure exerted on the streams is of a magnitude insufficient to crush the pieces and yet is sufficient to produce the lengths aforementioned. The amount of pressure exerted by the springs to attain this result may vary with the type of clay employed. Simple trial and error adjustment of the spring force will give the amount of spring pressure needed for the particular clay.

The opposed working forces of the conveyor belt and rollers apparently cause deflection of the dried clay pieces sufficient to break them into the cylindrical form without crushing the pieces. In this regard, the rollers 15 create a resisting force on one side of the clay pieces, which force is opposite to the conveying force of the belt on the opposite side of the pieces.

The resilient pressure of the rollers enables the rollers to move upwardly or downwardly to accommodate varying thicknesses of the mass of the superimposed clay streams supplied thereto. Occasionally, the mass may be of such a large thickness that little or no breaking action is imparted by a single roller. In this event, however, the pieces are properly broken by the action of the succeeding rollers.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. The method of making small clay cylinders including the steps of extruding clay in a plastic state into a plurality of thread-like streams, drying the streams, breaking the streams after drying into a number of varying lengths, and then subjecting the broken lengths to yieldable roller compression sufficient to break a substantial portion of said lengths into small cylinders of a substantially uniform size and shape but without crushing the lengths.

2. The method of making small clay cylinders including the steps of extruding clay in a plastic state into a plurality of thread-like streams, drying the streams, and then subjecting the streams to yieldable roller compression sufficient to break a substantial portion of said streams into small cylinders of a substantially uniform size and shape but without crushing the streams.

3. The method of claim 2 wherein the streams are subjected to plural rollers yieldably opposed to a conveying belt for the streams.

4. Apparatus for making small clay cylinders of generally uniform size including extrusion means for forming moist thread-like streams from a plastic clay mass, conveying means for delivering said streams to a drying tunnel formed and adapted to subject said streams to an elevated temperature and thereby dry the streams, conveying means having a conveying surface for removing the streams away from the tunnel, and a roller associated with said surface located outside of said tunnel for exerting compressive stresses on said streams without crushing said streams and thereby cause breaking said streams into short lengths.

5. The apparatus of claim 4 wherein said last named conveying means is in the form of a belt and said roller is yieldably biased into contact with the streams of clay carried on said belt.

6. The apparatus of claim 4 wherein said drying tunnel includes a plurality of vertically spaced conveyor belts with adjacent belts traveling in opposite directions, and each of said belts has one end thereof offset inwardly of the belt next below thereby allowing the clay streams passing said ends to be turned over as they reach the belt next below.

7. The apparatus of claim 4 wherein a plurality of rollers are spaced along the path of travel of said streams and associated with said conveying surface for breaking the streams into short lengths.

8. The apparatus of claim 4 characterized by and including means between the tunnel and roller for breaking the continuity of the streams before they reach said roller.

References Cited by the Examiner

UNITED STATES PATENTS

| | | | |
|---|---|---|---|
| 184,328 | 11/76 | Brodie | 241—65 |
| 2,032,624 | 3/36 | Lyons | 25—14 |
| 2,211,838 | 8/40 | Riggs | 241—159 |
| 2,350,096 | 5/44 | Chilton | 241—65 |
| 2,531,016 | 11/50 | Waechter | 18—47.5 |
| 2,557,068 | 6/51 | Berger | 18—9 |
| 2,614,288 | 10/52 | Chavnnes | 18—9 |
| 2,977,630 | 4/61 | Bazler | 18—5 |

FOREIGN PATENTS 67,114    7/13    Switzerland.

ROBERT F. WHITE, *Primary Examiner.*

ALEXANDER H. BRODMERKEL, *Examiner.*